United States Patent
Okabe et al.

(10) Patent No.: US 12,116,084 B2
(45) Date of Patent: Oct. 15, 2024

(54) TOOTHED BELT TRANSMISSION DEVICE

(71) Applicant: Mitsuboshi Belting Ltd., Kobe (JP)

(72) Inventors: Hirofumi Okabe, Hyogo (JP); Masakuni Yoshida, Hyogo (JP); Yuto Hoki, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 36 days.

(21) Appl. No.: 17/913,332

(22) PCT Filed: May 26, 2021

(86) PCT No.: PCT/JP2021/020100
§ 371 (c)(1),
(2) Date: Sep. 21, 2022

(87) PCT Pub. No.: WO2021/241660
PCT Pub. Date: Dec. 2, 2021

(65) Prior Publication Data
US 2023/0128744 A1    Apr. 27, 2023

(30) Foreign Application Priority Data

May 29, 2020  (JP) .................................. 2020-094540
May 17, 2021  (JP) .................................. 2021-083225

(51) Int. Cl.
*B62M 9/02*  (2006.01)
*D02G 3/02*  (2006.01)
(Continued)

(52) U.S. Cl.
CPC ................. *B62M 9/02* (2013.01); *D02G 3/02* (2013.01); *D02G 3/28* (2013.01); *D02G 3/447* (2013.01);
(Continued)

(58) Field of Classification Search
CPC .... F16G 1/10; F16G 1/28; F16G 1/08; D02G 3/02; D02G 3/28; D02G 3/447; B62M 9/02
(Continued)

(56) References Cited

U.S. PATENT DOCUMENTS 5,310,383 A * 5/1994 Lisi .......................... B62M 9/10
                                                            474/98
5,521,007 A * 5/1996 Kurokawa ................ F16G 5/06
                                                            428/397
(Continued)

FOREIGN PATENT DOCUMENTS

EP   3040580 A1    7/2016
JP   H04-331844 A  11/1992
(Continued)

OTHER PUBLICATIONS

JP 2017089897 A English translation from PE2E (Year: 2017).*
(Continued)

*Primary Examiner* — Henry Y Liu
(74) *Attorney, Agent, or Firm* — Banner & Witcoff, Ltd.

(57) ABSTRACT

A toothed belt power-transmission apparatus includes: a toothed belt which includes a cord and a plurality of belt tooth portions; and a plurality of toothed pulleys which include a plurality of pulley tooth portions. The cord includes a carbon fiber cord formed by combining and secondarily twisting a plurality of primary twisted yarns including a carbon fiber. A twisting direction of a primary twist of the primary twisted yarns is the same as a twisting direction of the secondary twist. A primary twisting coefficient of the primary twist is 0.62 to 1.30. A secondary twisting coefficient of the secondary twist is 2.06 to 3.95. A tooth pitch of the toothed belt is within a range of −0.4% to
(Continued)

+0.1% relative to a tooth pitch of the toothed pulley around which the toothed belt is wound.

4 Claims, 4 Drawing Sheets

(51) Int. Cl.
    *D02G 3/28*     (2006.01)
    *D02G 3/44*     (2006.01)
    *F16G 1/10*     (2006.01)
    *F16G 1/28*     (2006.01)

(52) U.S. Cl.
    CPC ................. *F16G 1/10* (2013.01); *F16G 1/28* (2013.01); *D10B 2101/12* (2013.01); *D10B 2505/02* (2013.01); *D10B 2505/12* (2013.01)

(58) Field of Classification Search
    USPC .................................................. 474/153, 205
    See application file for complete search history.

(56) References Cited

U.S. PATENT DOCUMENTS

| | | | | |
|---|---|---|---|---|
| 5,984,816 | A * | 11/1999 | Nishio | F16H 7/023 474/263 |
| 8,907,211 | B2 * | 12/2014 | Fox | H01B 9/028 174/33 |
| 9,353,466 | B2 * | 5/2016 | Knutson | F16G 1/10 |
| 9,765,851 | B2 * | 9/2017 | Kobayashi | F16G 1/28 |
| 10,436,286 | B2 * | 10/2019 | Matsukawa | F16H 7/023 |
| 2016/0208889 | A1 * | 7/2016 | Yoshida | B32B 5/02 |

FOREIGN PATENT DOCUMENTS

| | | | | |
|---|---|---|---|---|
| JP | H1068451 | * | 3/1998 | |
| JP | 2004-232854 A | | 8/2004 | |
| JP | 2004-245405 A | | 9/2004 | |
| JP | 2015-064103 A | | 4/2015 | |
| JP | 2017082377 A | * | 5/2017 | ............ C08J 5/06 |
| JP | 2017089897 A | * | 5/2017 | ............ B29D 29/08 |

OTHER PUBLICATIONS

JP 2017082377 A English translation from PE2E (Year: 2017).*
JP H1068451 A English translation from Pe2E (Year: 1998).*
Dec. 23, 2022—(TW) Office Action—App 110119428.
Aug. 17, 2021—International Search Report—Intl App PCT/JP2021/020100.
Dec. 23, 2021—(TW) Office Action—App 110119428.
Dec. 20, 2023—(CA) Office Action—App 3175907.
Nov. 17, 2022—(WO) International Preliminary Report on Patentability—App PCT/JP2021/020100.
Jun. 6, 2024—(EP) Extended Search Report—App 21814381.6.

* cited by examiner

TOOTHED BELT TRANSMISSION DEVICE

CROSS REFERENCE TO RELATED APPLICATIONS

This is a U.S. National Phase Application under 35 U.S.C. § 371 of International Application No. PCT/JP2021/020100, filed May 26, 2021, which claims priority to Japanese Application Nos. 2020-094540, filed May 29, 2020, and 2021-083225, filed May 17, 2021, which were published Under PCT Article 21(2), the entire contents of which are incorporated herein by reference.

TECHNICAL FIELD

The present invention relates to a toothed belt power-transmission apparatus used for synchronous transmission of an apparatus that transmits a high load by a belt.

BACKGROUND ART

A power-transmission belt for transmitting power is roughly classified into a frictional power transmission belt and a synchronous power transmission belt. Examples of the frictional power transmission belt include a flat belt, a V-belt, and a V-ribbed belt, and examples of the synchronous power transmission belt include a toothed belt. The toothed belt includes a back portion in which a cord is embedded substantially parallel to a belt longitudinal direction, tooth portions disposed at a predetermined interval in the belt longitudinal direction, and a tooth cloth covering surfaces of the tooth portions. The tooth portions of the toothed belt are fitted to a pulley having grooves facing the tooth portions to transmit power. The toothed belt does not slip with the pulley and can reliably transmit a high load, so that in recent years, the number of examples in which the toothed belt is used for driving a rear wheel of a motorcycle instead of a chain has been increased.

As a toothed belt used for high load transmission such as driving of a rear wheel of a motorcycle, a toothed belt in which a twisted cord of carbon fibers is used as a cord has been known. For example, Patent Literature 1 discloses a toothed belt in which a cord made of Lang's twisted carbon fibers and having a diameter of 1.1 mm or more and 2.5 mm or less is embedded. In addition, it is stated that, with the above configuration, flexural rigidity is decreased, tooth chipping due to an increase in stretching of the cord can be prevented, and occurrence of cord cutting due to a decrease in bending fatigue resistance of the cord can be prevented (in particular, Paragraph 0009). It is stated that a primary twisting coefficient of the cord may be 0.65 to 1.61 and a secondary twisting coefficient may be 1.14 to 3.61 (Paragraph 0021), and in Examples, a toothed belt having a tooth pattern (tooth profile) of H14M (tooth pitch: 14 mm) is produced using a cord having a primary twisting coefficient of 0.97 and a secondary twisting coefficient of 2.07.

Although the toothed belt including the cord disclosed in Patent Literature 1 exhibits a certain degree of durability for driving a rear wheel of the motorcycle, there is a problem in that the toothed belt cannot be made compact due to the tooth profile having a large pitch of 14 mm, and durability may be insufficient due to an increase in transmission power in recent years. In particular, when the meshing with the pulley deteriorates, the wear of the tooth cloth is promoted, and thus the durability of the belt is likely to deteriorate.

CITATION LIST

Patent Literature

Patent Literature 1: JP-A-2015-64103
Patent Literature 2: JP-A-H04-331844

SUMMARY OF INVENTION

Technical Problem

Therefore, a first object of the present invention is to provide a toothed belt that enables high load transmission even with a compact layout and has improved durability.

In a case where the meshing between the toothed belt and the pulley is discussed, the tooth pitch and the pitch line differential (PLD) are important. For example, Patent Literature 2 discloses a toothed belt power-transmission apparatus in which a pitch line distance (PLD) of a timing belt (toothed belt) is increased (enlarged) by 10% to 20% relative to a design PLD of a pulley (PLD of a pulley), and a pitch (tooth pitch of the toothed belt) is enlarged by 0.02% to 0.15% relative to a design pitch of the pulley (tooth pitch of the pulley).

A common technique discloses that while it is common to match the tooth pitch of the toothed belt with the tooth pitch of the pulley and to coincide with the PLD of the belt with the PLD of the pulley, the life becomes longer when the pitch difference between the belt and the pulley is slightly negative (the tooth pitch of the toothed belt is slightly smaller than the tooth pitch of the pulley). It is stated that this is because the tooth pitch of the toothed belt and the tooth pitch of the pulley coincide with each other since the toothed belt is stretched when a load torque is applied.

As disclosed in Patent Literature 2, it is known that the meshing can be optimized by setting the tooth pitch of the toothed belt slightly smaller than the tooth pitch of the pulley. However, in a transmission apparatus used for driving a rear wheel of a motorcycle, there is another factor affecting the meshing. In a motorcycle traveling outdoors, foreign matter such as gravel is likely to get into and accumulate between a toothed belt and a pulley (stone biting, sand biting). When the sand biting occurs, the meshing between the toothed belt and the pulley deteriorates because the toothed belt is brought into a state the same as the state where the PLD of the toothed belt is enlarged. That is, even if the toothed belt and the pulley ideally mesh with each other at an initial stage of running (when the motorcycle is new), the meshing deteriorates as the running distance increases, and there is a high possibility that the durability of the toothed belt deteriorates.

Therefore, a second object of the present application is to provide a toothed belt power-transmission apparatus in which the meshing can be maintained as ideal as possible and the life of the toothed belt can be improved even when there is a factor such as sand biting that causes the meshing between the toothed belt and the pulley to deteriorate.

Solution to Problem

In order to solve the above problems, the present invention provides a toothed belt power-transmission apparatus including: a toothed belt which includes a cord extending in a belt longitudinal direction and embedded in the belt and a plurality of belt tooth portions arranged at a predetermined interval in the belt longitudinal direction; and a plurality of toothed pulleys which include, on an outer circumference thereof, a plurality of pulley tooth portions facing the belt tooth portions and around which the toothed belt is wound, in which the cord contains a carbon fiber cord formed by combining and secondarily twisting a plurality of primary twisted yarns containing a carbon fiber, a twisting direction of a primary twist of the primary twisted yarns is the same as a twisting direction of the secondary twist, a primary twisting coefficient of the primary twist is 0.62 to 1.30, a secondary twisting coefficient of the secondary twist is 2.06 to 3.95, and a tooth pitch of the toothed belt is within a range of −0.4% to +0.1% relative to a tooth pitch of the toothed pulley around which the toothed belt is wound.

According to the above configuration, the cord embedded in the toothed belt includes the carbon fibers, so that the tensile strength is improved, and the durability in high-load transmission is improved.

The bending fatigue resistance of the cord is improved by combining a plurality of primary twisted yarns to form a secondary twist, and setting the twisting direction of the primary twist and the twisting direction of the secondary twist to be the same (Lang's twist).

Further, by setting the primary twisting coefficient and the secondary twisting coefficient to the above ranges, the stretching of the cord and the toothed belt can be prevented while ensuring the bending fatigue resistance, and the durability is improved. When the primary twisting coefficient and the secondary twisting coefficient are smaller than the above ranges, the bending fatigue resistance decreases, and conversely, when the primary twisting coefficient and the secondary twisting coefficient are larger than the above ranges, the tensile strength decreases and the stretching of the toothed belt increases, and the durability decreases.

When the tooth pitch of the toothed belt is out of the range of −0.4% to +0.1% relative to the tooth pitch of the toothed pulley around which the toothed belt is wound, the meshing between the teeth of the toothed belt and the teeth of the toothed pulley may deteriorate, and the durability of the toothed belt may deteriorate. Therefore, within the above range, deterioration of meshing between the teeth of the toothed belt and the teeth of the toothed pulley can be prevented, and deterioration of durability of the toothed belt can be prevented.

According to the present invention, in the toothed belt power-transmission apparatus, the tooth pitch of the toothed belt may be within a range of −0.2% to +0.1% relative to the tooth pitch of the toothed pulley.

By setting the tooth pitch of the toothed belt relative to the tooth pitch of the toothed pulley to be within a range larger than that of a product according to the related art (a toothed belt whose tooth pitch is made smaller than the tooth pitch of the toothed pulley and which is intended to cope with the stretching of the toothed belt due to use), the deterioration of the meshing due to the sand biting can be prevented, and the durability of the toothed belt can be further improved.

In the present invention, the toothed belt power-transmission apparatus may be used for driving a rear wheel of a motorcycle.

According to the above configuration, it is possible to obtain a toothed belt power-transmission apparatus in which the meshing between teeth of both a driving-side toothed pulley (small-diameter pulley) and a driven-side toothed pulley (large-diameter pulley) can be favorably maintained even when a toothed belt is stretched due to a high load caused by driving a rear wheel of a motorcycle, and the durability of the toothed belt can be improved.

Advantageous Effects of Invention

It is possible to provide a toothed belt that enables high load transmission even with a compact layout and has improved durability, and a toothed belt power-transmission apparatus in which the meshing can be maintained as ideal as possible and the life of the toothed belt can be improved even when there is a factor such as sand biting that causes the meshing between the toothed belt and the pulley to deteriorate.

DESCRIPTION OF EMBODIMENTS

Next, an embodiment of the present invention is described with reference to the drawings.

(Toothed Belt 3 and Toothed Belt Power-Transmission Apparatus 21)

Figure 1:
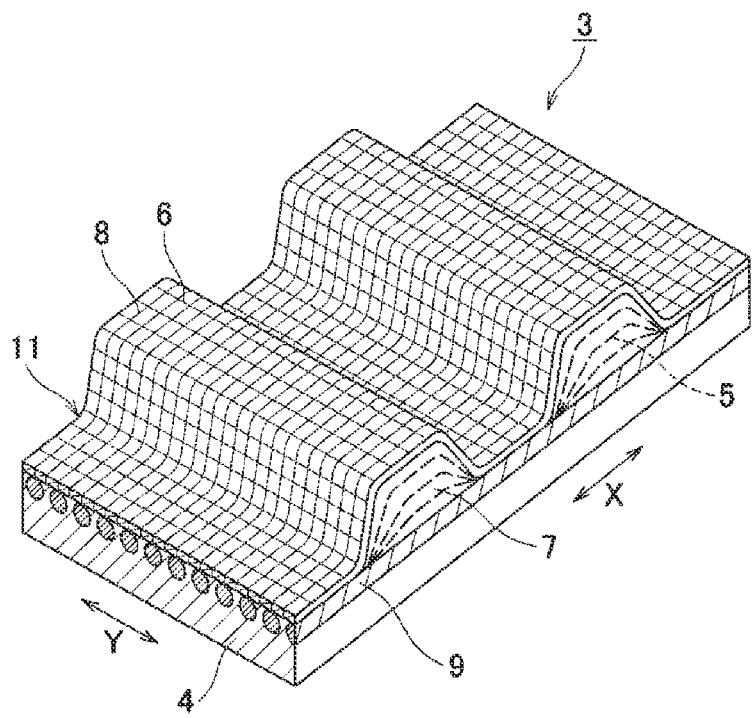
FIG. 1 is a cross-sectional perspective view of a toothed belt according to an embodiment.
Figure 2:
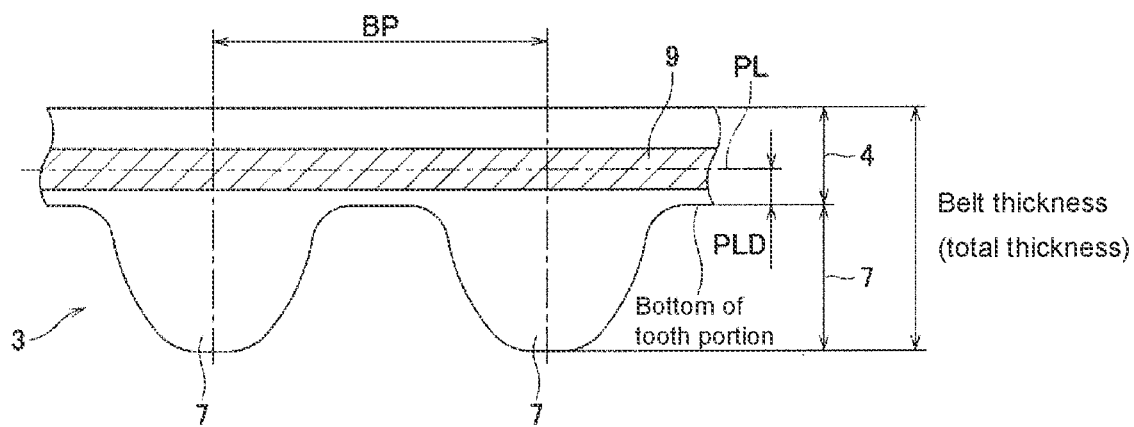
FIG. 2 is a cross-sectional view of the toothed belt according to the embodiment and shows a relation between a cord and a PLD.

As shown in FIGS. 1 and 2, the toothed belt 3 includes a plurality of tooth portions 7 which are disposed at a predetermined interval along a belt longitudinal direction (X direction) and whose surfaces are covered with a tooth cloth 11, and a back portion 4 in which cords 9 are embedded in a manner of extending in the belt longitudinal direction.

Figure 6:
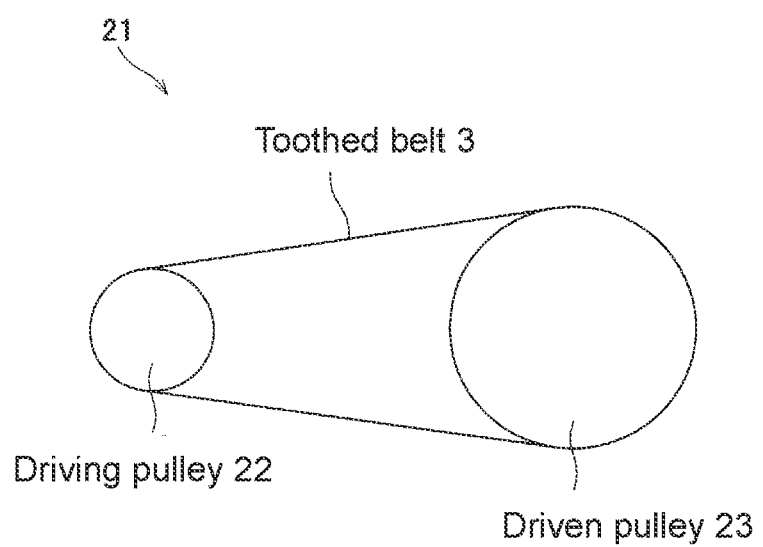
FIG. 6 is a schematic view of a toothed belt power-transmission apparatus according to an embodiment (also a schematic view of a running tester according to Examples).

The toothed belt 3 is wound around a plurality of pulleys and is widely used as a power transmission mechanism. For example, the toothed belt 3 is used for a toothed belt power-transmission apparatus for high load transmission such as driving of a rear wheel of a motorcycle. Specifically, as shown in FIGS. 6 and 3, this is implemented as a toothed belt power-transmission apparatus 21 in which the toothed belt 3 is wound around a driving pulley 22 (toothed pulley) and a driven pulley 23 (toothed pulley: not shown in FIG. 3).

Figure 3:
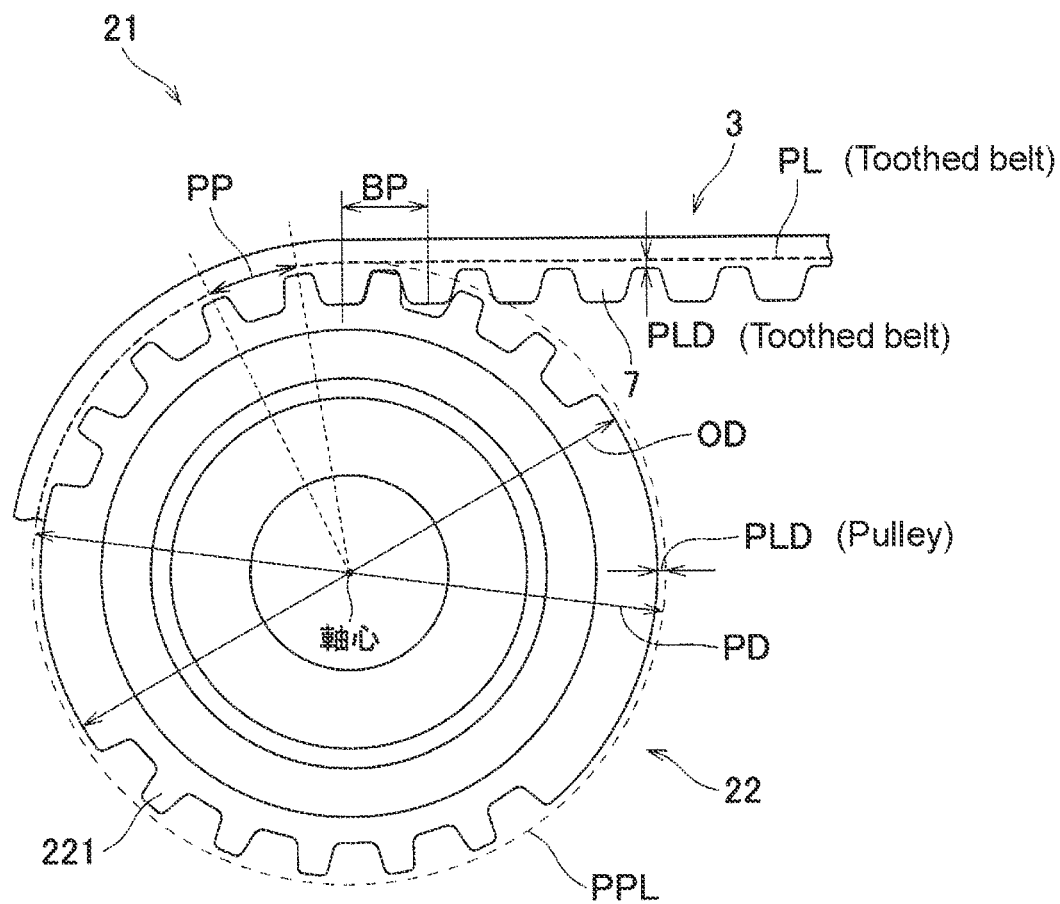
FIG. 3 is an illustration view relating to names for illustrating configurations (dimensions) of the toothed belt and a driving pulley (driven pulley) according to the embodiment.

As shown in FIG. 3, a plurality of driving pulley teeth 221 (corresponding to pulley tooth portions), which face the tooth portions 7 (corresponding to belt tooth portions) of the toothed belt 3 respectively, are provided on an outer circumference of the driving pulley 22. A plurality of driven pulley teeth 231 (corresponding to pulley tooth portions), which face the tooth portions 7 of the toothed belt 3 respectively, are also provided on an outer circumference of the driven pulley 23 (not shown).

The driving pulley 22 in the present embodiment is assumed to be relatively smaller than the driving pulley in Patent Literature 1 in an outer diameter range of 67 mm to 90 mm for a medium-sized (displacement of about 500 cc) motorcycle. Specifically, the driving pulley in Patent Literature 1 has a tooth profile of H14M and a tooth number of 33 (outer diameter: about 144 mm), and is used for a large motorcycle. In contrast, the driving pulley 22 in the present embodiment is assumed to be a small pulley having a tooth profile of H11M and a tooth number of 26 (outer diameter of about 89 mm) for a medium-sized (displacement of about 500 cc) motorcycle (the tooth pitch PP and the outer diameter of the pulley are small due to demand for compactness).

An outer diameter OD of the driven pulley 23 is larger than an outer diameter OD of the driving pulley 22. Therefore, although the number of the teeth 231 of the driven pulley 23 is larger than the number of the driving pulley teeth 221 of the driving pulley 22, the PLD (pitch line distance) of the driving pulley 22 and the PLD of the driven pulley 23 coincide with each other, and the tooth pitch PP of the driving pulley 22 and the tooth pitch PP of the driven pulley 23 coincide with each other.

Here, names for illustrating configurations (dimensions) of the toothed belt 3 and the driving pulley 22 (driven pulley 23) are defined with reference to FIGS. 2 and 3.

Tooth pitch BP of the toothed belt 3: the distance between the adjacent tooth portions 7 (the tooth pitch BP of the toothed belt 3 varies depending on the tensile force and the bending diameter, and thus is defined by "the length (circumferential length) of the toothed belt 3/the number of tooth portions 7 (the number of teeth)")

PL (pitch line) of the toothed belt 3: line connecting the center positions of the cords 9 of the toothed belt 3

PLD (pitch line distance) of the toothed belt 3: distance from a bottom portion of the toothed portion 7 to PL (centers of the cords 9) of the toothed belt 3

Outer diameter OD of pulley: diameter of circle of tooth tip of pulley

Pulley pitch circumference PPL: a line connecting the center positions of the cords 9 of the toothed belt 3 on the outer circumference of the pulley in a state in which the toothed belt 3 is wound around the pulley Pitch diameter PD: diameter of pulley pitch circumference PPL Tooth pitch PP of pulley: distance between adjacent tooth portions (length of arc) on the pulley pitch circumference PLD of pulley (pitch line distance): distance from a tooth tip of the pulley to the pulley pitch circumference PPL (defined by "(pitch diameter PD−outer diameter OD of pulley)/2")

(Details of Toothed Belt 3: Cord 9)

The cords 9 are embedded in the back portion 4 in a state of being spirally wound in the belt longitudinal direction, and are disposed at a predetermined interval in a cross-sectional view in a belt width direction (Y direction) (see FIG. 1).

The cords 9 each include a Lang's twisted carbon fiber cord in which a twisting direction of primary twist is the same as a twisting direction of secondary twist. The cords 9 are in the form of Lang's twist, so that flexural rigidity is decreased, and excellent bending fatigue resistance is obtained, as compared with plied twist or single twist. As the carbon fibers, for example, "TORAYCA" (trade name) manufactured by Toray Industries, Inc. is used. The Lang's twisted carbon fiber cord can be formed as follows. First, a multifilament yarn of carbon fibers having a fineness of 300 to 1000 tex is impregnated with a treatment liquid obtained by dissolving a rubber latex and an epoxy resin in a solvent such as toluene, to allow the treatment liquid adhere to the multifilament yarn, and an adhesion-treated yarn is produced. Then, the produced adhesion-treated yarn is subjected to primary twist in the S or Z direction with a primary twisting coefficient of 0.62 to 1.30 to produce a primary twisted yarn, and 2 to 4 primary twisted yarns are combined and further subjected to secondary twist in the same direction as that of the primary twist with a secondary twisting coefficient of 2.06 to 3.95. In this way, the Lang's twisted carbon fiber cord is obtained. Here, the twist factor TF is expressed by $TF=(\text{fineness (tex)})^{1/2} \times T/960$ (T: the number of twists per meter).

The multifilament yarn of carbon fibers may be selected from multifilament yarns of 6K, 12K. or the like having different numbers of filaments. The term "6K" denotes a multifilament yarn in which the number of filaments is 6000, and the term "12K" denotes a multifilament yarn in which the number of filaments is 12000. The fineness of the multifilament yarn of 6K is about 400 tex, and the fineness of the multifilament yarn of 12K is about 800 tex.

When the fineness of the multifilament yarn of the carbon fibers is more than 1000 tex, the bending fatigue resistance may decrease. Conversely, when the fineness of the multifilament yarn of the carbon fibers is less than 300 tex, the material cost increases, and the number of the primary twisted yarns necessary for producing the cord 9 having sufficient tensile strength increases, which leads to an increase in the number of work steps. Therefore, in order to sufficiently ensure the bending fatigue resistance and the suitability of the cost and the number of working steps, as the range of the fineness of the multifilament yarn of the carbon fibers, the lower limit value is preferably 500 tex or 700 tex, and the upper limit value is preferably 900 tex.

In the present embodiment, a Lang's twisted carbon fiber cord (12K-1/4) is used as the cord 9. The Lang's twisted carbon fiber cord is obtained by primarily twisting one 12K-multifilament yarn (with a fineness about 800 tex) to produce a primary twisted yarn, and combining and secondarily twisting four produced primary twisted yarns. Note that "12K-1/4" represents a twisted cord obtained by primarily twisting one 12K-multifilament yarn to produce a primary twisted yarn, and combining and secondarily twisting four produced primary twisted yarns. Similarly, "12K-1/3" represents a twisted cord obtained by primarily twisting one multifilament yarn of 12K to produce a primary twisted yarn, and combining and secondarily twisting three produced primary twisted yarns. In addition, "12K-4/0" represents a twisted cord obtained by combining and singly twisting four 12K-multifilament yarns.

It is preferable that the rubber latex in the treatment liquid used for forming the Lang's twisted carbon fiber cord is made of the same kind of rubber composition as the rubber composition constituting the back portion 4 and the tooth portions 7. As the epoxy resin, one or more of ethylene glycol diglycidyl ether, glycerol polyglycidyl ether, trimethylolpropane polyglycidyl ether, sorbitol polyglycidyl ether, hexanediol diglycidyl ether, and the like are used.

Figure 5:
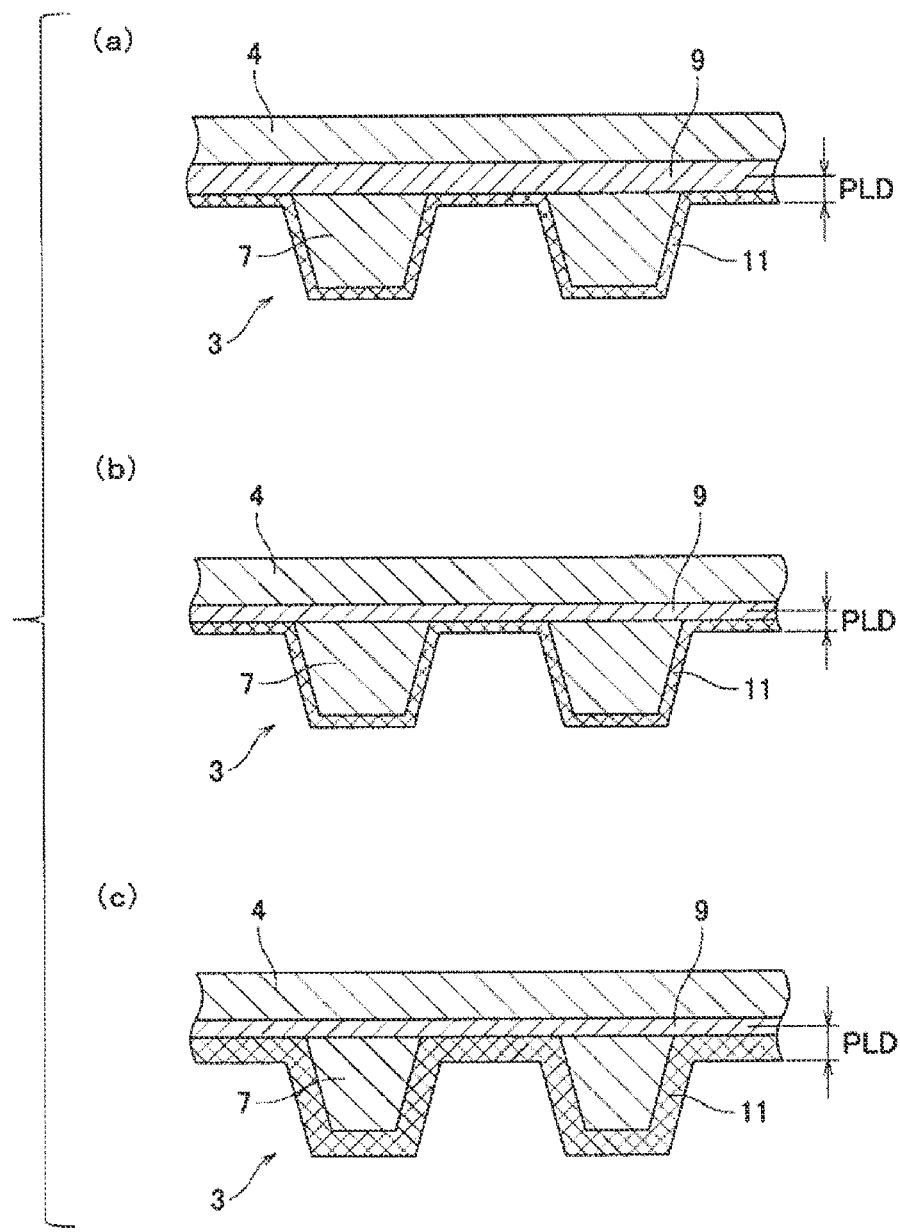
FIG. 5 is a cross-sectional view of a toothed belt and shows a relation between a cord and a PLD when a diameter of the cord and a thickness of a tooth cloth are changed.

A cord diameter of the cord 9 is preferably 1.1 mm or more and 2.5 mm or less. When the cord diameter is less than 1.1 mm, the stretching of the cord 9 is increased, and thus tooth chipping (chipping of the tooth portions 7) is likely to occur. When the cord diameter is more than 2.5 mm, the bending fatigue resistance of the cord 9 is decreased, so that cord cutting is likely to occur. The PLD of the toothed belt 3 is determined by a relation between the thickness of the tooth cloth 11 and the cord diameter of the cord 9 as shown in (a) of FIG. 5. Therefore, when the cord diameter is less than 1.1 mm, only a small PLD can be set as shown in (b) of FIG. 5, and an appropriate PLD is less likely to be obtained. Further, even if the cord diameter is small, a large PLD can be obtained as shown in (c) of FIG. 5 if the tooth cloth 11 is made thick, but the volume of the rubber of the tooth portions 7 is reduced, and as a result, the tooth chipping resistance decreases. The lower limit value of the cord diameter of the cord 9 is preferably 1.2 mm, more preferably 1.6 mm, and particularly preferably 1.9 mm, and the upper limit value thereof is preferably 2.4 mm, and more preferably 2.2 mm.

Here, the PLD of the toothed belt 3 may be 0.8 to 2.0 mm, preferably 0.9 to 1.5 mm, and more preferably 1.0 to 1.2 mm because both bending fatigue resistance and tooth chipping resistance can be achieved. Further, it is preferable that the PLD of the toothed belt 3 and the PLD of the driving pulley 22 substantially coincide with each other. Specifically, it can be said that the PLD of the toothed belt 3 substantially coincides with the PLD of the driving pulley 22 as long as the difference therebetween is within a range of −5% to +5%.

(Back Portion 4)

The back portion 4 is made of a rubber composition having a JIS-A hardness of 80 degrees or more and 89 degrees or less. Here, the JIS-A hardness is a hardness in accordance with JIS K 6253 (2012), and is a hardness of a surface of the back portion 4 of the toothed belt 3 measured using a type A durometer. When the JIS-A hardness of the back portion 4 is set to 80 degrees or more and 89 degrees or less, the flexural rigidity of the back portion 4 is decreased, and excellent bending fatigue resistance is obtained. When the JIS-A hardness of the back portion 4 is less than 80 degrees, a crack may occur in the back portion 4 due to collision with foreign matter or the like. When the JIS-A hardness of the back portion 4 exceeds 89 degrees, the bending fatigue resistance decreases, and a crack is likely to occur in the back portion 4.

As the rubber composition constituting the back portion 4 (rubber composition (B), hereinafter referred to as "back portion rubber"), it is preferable to use a mixture of hydrogenated nitrile rubber (hereinafter referred to as "HNBR") and hydrogenated nitrile rubber containing an unsaturated carboxylic acid metal salt (hereinafter referred to as "HNBR containing an unsaturated carboxylic acid metal salt"), and the hardness is adjusted by changing a mixing ratio of both. Specifically, in order to obtain a hardness of 80 degrees or more and 89 degrees or less, it is preferable that mixing is performed by setting a mass ratio of "HNBR" to "HNBR containing an unsaturated carboxylic acid metal salt" to 40:60 to 100:0. As the HNBR containing the unsaturated carboxylic acid metal salt, for example, those (for example, "Zeoforte (ZSC)" (trade name) manufactured by Zeon Corporation) in which zinc methacrylate, which is an unsaturated carboxylic acid metal salt, is highly finely dispersed in the HNBR may be used.

The HNBR is obtained by chemically hydrogenating an unsaturated bond (carbon-carbon double bond) of nitrile rubber in the related art in order to prevent rubber elasticity from aging due to a recombination reaction of sulfur during heat aging while maintaining oil resistance which is an advantage of the nitrile rubber in the related art, so that the recombination reaction during heat aging is less likely to occur and heat resistance of the HNBR is improved. The unsaturated carboxylic acid metal salt is obtained by ionically bonding an unsaturated carboxylic acid having one or more carboxyl groups to a metal. Examples of the unsaturated carboxylic acid include monocarboxylic acids such as acrylic acid and methacrylic acid, and dicarboxylic acids such as maleic acid, fumaric acid, and itaconic acid. Examples of the metal include magnesium, titanium, iron, copper, zinc, aluminum, lead, and nickel.

The HNBR used in the present invention is unsaturated rubber having an iodine value within a range of 7 to 30 mg/100 mg, and preferably within a range of 11 to 28 mg/100 mg. Here, the unsaturated rubber refers to rubber having an unsaturated bond including a carbon-carbon double bond (C=C bond) in a polymer molecular chain. The iodine value is an index indicating the number of unsaturated bonds, and a high iodine value indicates that the number of unsaturated bonds contained in the polymer molecular chain is large. As a method for measuring the iodine value, the iodine value is determined by adding an excess amount of iodine to a measurement sample to cause a complete reaction (reaction between iodine and an unsaturated bond), and the amount of remaining iodine is quantified by oxidation-reduction titration. When the iodine value of the HNBR is less than 7 mg/100 mg, a crosslinking reaction between the HNBR molecules is not sufficient, and the rigidity of the tooth portion is decreased. Therefore, a problem such as tooth chipping may occur during running of the belt. On the other hand, when the iodine value of HNBR exceeds 30 mg/100 mg, the number of unsaturated bonds becomes excessively large, and deterioration of the heat resistance of the tooth portion or deterioration due to oxidation proceeds, and the life of the belt may be shortened.

(Tooth Portions 7)

The tooth portions 7 are made of a rubber composition having a JIS-D hardness (a value measured using a type D durometer) of 60 degrees or more and 66 degrees or less. Here, the JIS-D hardness is a hardness in accordance with JIS K 6253 (2012), and is a hardness of a side surface of the tooth portion 7 of the toothed belt 3 measured using a type D durometer. Note that the type D durometer is a tester for a high hardness, and in a case where a value measured using the type A durometer exceeds 90 degrees, it is desirable to use the type D durometer. The hardness of the rubber composition constituting the tooth portions 7 is higher than the hardness of the rubber composition constituting the back portion 4, and the JIS-A hardness thereof exceeds 90 degrees. Therefore, the hardness of the rubber composition constituting the tooth portions 7 is a value measured using a type D durometer.

As the rubber composition constituting the tooth portions 7 (rubber composition (A), hereinafter referred to as "tooth portion rubber"), a mixture of HNBR and HNBR containing an unsaturated carboxylic acid metal salt is preferably used similarly to the back portion 4, and the hardness is adjusted by changing a mixing ratio of both. Specifically, it is preferable that mixing is performed by setting a mass ratio of "HNBR" to "HNBR containing an unsaturated carboxylic acid metal salt" to 50:50 to 0:100.

Furthermore, it is preferable that short fibers 5 such as aromatic polyamide are embedded in the rubber composition constituting the tooth portions 7. It is preferable that the short fibers 5 are embedded in such a manner that the short fibers 5 are oriented along outer shapes of the tooth portions 7 on a side close to the tooth cloth 11, and the short fibers 5 are oriented to be substantially parallel to the cord 9 as the short fibers 5 approach the cord 9. The kind of the short fibers 5 is not particularly limited, and fibers having high modulus such as aramid fibers, PBO (polyparaphenylene benzobisoxazole) fibers, polyvinyl alcohol fibers, and carbon fibers may be preferably used.

In addition, in the rubber composition constituting the tooth portions 7, a powdery reinforcing inorganic filler is preferably blended in a blending amount of 10 parts by mass or less relative to 100 parts by mass (the total amount) of a rubber component including the HNBR and the HNBR containing the unsaturated carboxylic acid metal salt. The blending amount is more preferably within a range of 0.1 to 8 parts by mass, 0.5 to 5 parts by mass, or 1 to 3 parts by mass. When the blending amount of the powdery reinforcing inorganic filler exceeds 10 parts by mass relative to 100 parts by mass (the total amount) of the rubber component, the heat generation of the rubber composition constituting the tooth portions 7 increases, and the heat resistance of the rubber composition decreases. Therefore, tooth chipping or a crack may occur due to heat aging.

In the present embodiment, it is not always necessary to blend a powdery reinforcing inorganic filler such as carbon black or silica into the rubber composition constituting the tooth portions 7. In particular, carbon black may be blended to such an extent that the rubber composition constituting the tooth portions 7 can be colored in black. The blending amount of carbon black is preferably 10 parts by mass or less relative to 100 parts by mass (the total amount) of the rubber component including the HNBR and the HNBR containing the unsaturated carboxylic acid metal salt, and the blending amount is more preferably within a range of 0.1 to 8 parts by mass, 0.5 to 5 parts by mass, and 1 to 3 parts. Carbon black is used as a colorant, and carbon black is most suitable for coloring the rubber composition in black.

The rubber composition constituting the tooth portions 7 preferably contains a non-reinforcing filler. Examples of the non-reinforcing filler include polyvalent metal carbonates (such as calcium carbonate and magnesium carbonate), polyvalent metal hydroxides (such as aluminum hydroxide), polyvalent metal sulfates (such as barium sulfate), silicates (natural or synthetic silicates in which a part of silicon is substituted with polyvalent metal atoms, such as aluminum silicate, magnesium silicate, and magnesium aluminum silicate; minerals containing a silicate as a main component, for example, clay containing aluminum silicate, silicate minerals such as talc and mica containing magnesium silicate, and the like), lithopone, silica sand, and the like. One of these non-reinforcing fillers may be used alone or two or more kinds thereof may be used in combination. The non-reinforcing filler is preferably at least one selected from calcium carbonate, magnesium carbonate, aluminum hydroxide, barium sulfate, silicates (silicates such as aluminum silicate, magnesium silicate, and magnesium aluminum silicate, or silicate minerals (such as talc, clay, and mica)). Furthermore, the non-reinforcing filler preferably contains at least one selected from calcium carbonate, magnesium silicate or talc containing magnesium silicate, and aluminum silicate or clay containing aluminum silicate, and particularly preferably contains calcium carbonate, from the viewpoint that the effect of improving the processability of the belt and the dispersibility of the compounding agent is large and that poor dispersion of the compounding agent is less likely to occur. As the non-reinforcing filler, a powdery filler commercially available as a filler for rubber may be used.

An average particle diameter (average primary particle diameter) of the non-reinforcing filler may be selected from a range of, for example, about 0.01 to 25 μm (for example, about 0.2 to 20 μm), and preferably about 0.5 to 17 μm (for example, about 1 to 15 μm). The average particle diameter (average primary particle diameter) of the non-reinforcing filler may be, for example, about 0.01 to 3 μm (for example, 0.02 to 2 μm), preferably about 0.05 to 1.5 μm (for example, 0.1 to 1 μm), or may be relatively large. For example, the average particle diameter (average primary particle diameter) of the non-reinforcing filler may be about 0.2 to 5 μm (for example, 0.3 to 3 μm), and preferably about 0.5 to 2.5 μm (for example, 1 to 2 μm). Depending on the kind of the non-reinforcing filler, for example, magnesium silicate or a mineral thereof, the non-reinforcing filler may be pulverized or crushed in the process of kneading with a rubber component or the like. The average particle diameter of the non-reinforcing filler having such pulverizability or crushability may be an average particle diameter before kneading with a rubber component or the like. The non-reinforcing filler may generally have an average particle diameter in the above-described range (for example, 0.1 to 10 μm, preferably 0.5 to 5 μm, and more preferably 1 to 3 μm) in the tooth portion or the rubber composition thereof. The average particle diameter of the non-reinforcing filler may be measured as a volume average particle diameter using a laser diffraction type particle diameter distribution measurement device. The average particle diameter of the filler having a nanometer size may be calculated as an arithmetic average particle diameter of samples in an appropriate number (for example, 50 samples) by image analysis of an electron micrograph including a scanning electron micrograph.

The proportion of the non-reinforcing filler may be about 3 to 50 parts by mass (for example, 5 to 40 parts by mass), preferably about 5 to 30 parts by mass (for example, 6 to 25 parts by mass), and more preferably about 7 to 20 parts by mass (for example, 8 to 15 parts by mass) relative to 100 parts by mass (the total amount) of the rubber component. When the content of the non-reinforcing filler is too small, the processability of the belt and the dispersibility of the compounding agent may not be sufficiently improved, and when the content of the non-reinforcing filler is too large, the dispersibility of the compounding agent may be poor.

When the non-reinforcing filler is used in a relatively large proportion, the dispersibility of various compounding agents (such as zinc oxide, reinforcing filler, and short fibers) in the rubber kneading can be improved, the uniformity of the rubber composition can be improved, the loss factor Tan δ is not greatly increased, and heat generation due to deformation of the rubber can be prevented. Therefore, both the occurrence and the growth of a crack can be prevented, and the tooth chipping resistance of the toothed belt can be greatly improved.

Regarding a vulcanizate of the rubber composition used for the tooth portions 7 of the present embodiment, it is preferable that a storage modulus (E') at an ambient temperature of 70° C., which is measured in accordance with JIS K6394 (2007), is 200 to 300 MPa, and a loss factor (Tan δ) is within a range of 0.1 to 0.2. Within this range, problems such as tooth chipping are less likely to occur, and deformation of the toothed portions 7 is prevented, so that meshing with the toothed pulleys (the driving pulley 22 and the driven pulley 23) is not hindered, and durability is improved.

E' represents an elastic modulus obtained from a dynamic state test in which periodic vibration is applied, and is defined as a ratio of elastic stress in the same phase to strain. As E' is higher, an object is less likely to be deformed, and the deformation amount is reduced even with a strong external force such as a high load condition, so that a crack, a cut, or the like is less likely to occur. On the other hand, when E' is lowered, the object is likely to be deformed, and thus the object is easily cut and broken even with a small external force.

Tan δ is obtained by dividing the loss elastic modulus (E'') by E', and is a measure of a ratio of energy dissipated as heat during one vibration cycle and the maximum energy stored. That is, Tan δ represents the ease of dissipation of the vibration energy applied to the rubber composition as heat, and as Tan δ increases, most of the energy applied from the outside is converted into heat, so that the temperature of the rubber composition increases due to self-heating and the heat resistance decreases. On the other hand, as Tan δ decreases, the calorific value is kept to be low, and therefore the heat resistance of the rubber composition is improved.

(Tooth Cloth 11)

A base material of the tooth cloth 11 is a fiber fabric formed by weaving warps 6 extending in the belt width direction and wefts 8 extending in the longitudinal direction of the belt. The fiber fabric is made of a plain weave fabric, a twill weave fabric, a satin weave fabric, or the like. As a fiber material constituting the fiber fabric, for example, aramid fibers, urethane elastic yarns, aliphatic fibers (such as nylon 6, nylon 66, polyester, and polyvinyl alcohol), or the like may be used. The tooth cloth 11 may not be provided.

As the fiber fabric in the present embodiment, a fiber fabric having a multi-woven (double woven) structure that is woven by two kinds of wefts 8 and one kind of warp 6 may also be employed. In this case, it is preferable that the warp 6 is made of a nylon fiber, and fluorine-based fibers, nylon fibers, and urethane elastic yarns are used for the weft 8. In addition, among the wefts 8, as a weft 8 positioned (exposed) on a front surface side of the tooth cloth 11 (a side where the belt meshes with the toothed pulley), it is preferable to use fluorine-based fibers (for example, PTFE fibers) having a low friction coefficient in order to reduce friction between the tooth cloth 11 and the toothed pulley. On the other hand, by using fibers (nylon fibers or urethane elastic yarns) other than the fluorine-based fibers for a weft 8 positioned on a back surface side of the tooth cloth 11 (a side that adheres to the tooth portions 7), the adhesive force between the tooth cloth 11 and the rubber constituting the tooth portions 7 can be increased.

It is preferable that low-melting-point fibers having a melting point at which the fibers melt at the vulcanization temperature of the tooth portions 7 and the back portion 4 using rubber as abase material are arranged around the fluorine-based fibers. Specifically, the arrangement includes a mode in which the fluorine-based fibers and the low-melting-point fibers are mixed and twisted, and a mode in which the fluorine-based fibers are covered with the low-melting-point fibers. Vulcanization conditions (vulcanization temperature and vulcanization time) of the tooth portions 7 and the back portion 4 are not particularly limited, and are generally determined with reference to a vulcanization curve measured using a Mooney viscometer or another vulcanization behavior measuring instrument in consideration of the kinds of vulcanizing agents and vulcanization accelerators, vulcanization methods, and the like. The general vulcanization conditions determined in this manner are a vulcanization temperature of 100° C. to 200° C. and a vulcanization time of about 1 minute to 5 hours. Secondary vulcanization may be performed as necessary.

In this case, the low-melting-point fibers are melted during vulcanization of the tooth portions 7 and the back portion 4, the molten low-melting-point fibers flow between fibers constituting the tooth cloth 11, followed by performing cooling until the temperature is equal to or lower than the melting point, and the low-melting-point fibers are crystallized. Therefore, when the belt meshes with the toothed pulley or when the belt is disengaged from the toothed pulley, the fluorine-based fibers are prevented from being cut or scattered by an impact or wear generated on the surface of the tooth cloth 11. Accordingly, the tooth portions 7 and the back portion 4 can be protected for a longer period of time, tooth chipping of the belt can be prevented, and the life during high load traveling can be long.

As the low-melting-point fibers, for example, polyamide-based fibers, polyester-based fibers, or olefin-based fibers having a melting point of preferably lower than 165° C. and more preferably lower than 150° C. may be used.

Examples of the polyamide-based fiber that may be used as the low-melting-point fibers include copolyamide fibers made of a combination of a W-aminocarboxylic acid component or a dicarboxylic acid component and a diamine.

The polyester-based fibers that may be used as the low-melting-point fibers are preferably core-sheath composite fibers made of a polyester-based polymer as a core component having a melting point higher than the vulcanization temperature of the tooth portions 7 and the back portion 4, and a copolymerized polyester-based polymer as a sheath component having a melting point lower than the vulcanization temperature of the tooth portions 7 and the back portion 4. Examples of the polyester-based polymer as the core component having a melting point higher than the vulcanization temperature of the tooth portions 7 and the back portion 4 include polyethylene terephthalate, polybutylene terephthalate, and copolymers thereof. The copolymerized polyester-based polymer as the sheath component having a melting point lower than the vulcanization temperature of the tooth portions 7 and the back portion 4 is obtained by a polycondensation reaction of a dibasic acid and a diol, and examples thereof include isophthalic acid, adipic acid, sebacic acid, butanediol, hexanediol, polyethylene glycol, neopentyl glycol, and the like as a copolymer component based on terephthalic acid and diethylene glycol. The melting point can be adjusted by a combination thereof and a copolymerization ratio thereof.

Examples of the olefin-based fibers that may be used as the low-melting-point fibers include polypropylene fibers and polyethylene fibers (such as high-density polyethylene fibers, medium-density polyethylene fibers, low-density polyethylene fibers, linear low-density polyethylene fibers, and ultra-high molecular weight polyethylene fibers).

The low-melting-point fibers may be obtained by copolymerizing these polymers, and the twisting method and the configuration of the fibers are not particularly limited as long as the fiber melts at the vulcanization temperature of the tooth portions 7 and the back portion 4. The surfaces of these low-melting-point fibers may be subjected to a plasma treatment or the like for the purpose of increasing the affinity with an adhesion treatment agent.

The tooth cloth 11 is bonded to the rubber constituting the tooth portions 7 through a series of adhesion treatments including, for example, the following steps.

(1) The fiber fabric constituting the tooth cloth 11 is impregnated with a resorcin-formalin-rubber latex treatment liquid (hereinafter referred to as an RFL treatment liquid), and drying is performed.

It is preferable to add, to the RFL treatment liquid, at least one vulcanization aid among an aqueous dispersion of a sulfur compound, a quinone oxime compound, a methacrylate compound, and a maleimide compound, or a solution obtained by dispersing these vulcanization aids in water.

As the aqueous dispersion of the sulfur compound, for example, an aqueous dispersion of sulfur, tetramethylthiuram disulfide, or the like may be adopted. As the quinonedioxime compound, for example, p-quinonedioxime or the like may be adopted. As the methacrylate compound, for example, ethylene glycol dimethacrylate, trimethylolpropane trimethacrylate, or the like may be used. As the maleimide compound, N,N'-m-phenylene bismaleimide, N,N'-(4,4'-diphenylmethane bismaleimide), or the like may be used.

Note that the "water" in the description "a solution obtained by dispersing these vulcanization aids in water"

described above may contain, for example, a slight amount of alcohol such as methanol. According to this, even when the "vulcanization aid" is insoluble in water, the affinity of the "vulcanization aid" to water is improved, and the "vulcanization aid" is easily dispersed.

As described above, the following effects are expected by adding the vulcanization aid to the RFL treatment liquid. That is, the chemical bonding force between the rubber latex component contained in the RFL treatment liquid and the outer layer rubber (which means the rubber glue or the rolled rubber used in the rubber glue treatment of (2) described later or the coating treatment of (3) described later, and which means the rubber constituting the tooth portions 7 in a case where the coating treatment is omitted) is strengthened, so that the adhesion is improved and the debonding of the tooth cloth 11 is prevented. As a further expected effect, it is considered that the chemical bonding force (crosslinking force) of the rubber latex component itself contained in the RFL treatment liquid is strengthened, and as a result, the debonding due to the breakage of the outer layer rubber to be bonded precedes the debonding due to the cohesive breakage of the adhesive layer (that is, interlayer debonding).

In a case where a vulcanization aid is added to the RFL treatment liquid, the impregnation treatment of the fiber fabric may be performed twice. In this case, first, none of the vulcanization aids described above is added to the RFL treatment liquid in the first RFL impregnation treatment. This is because the thermal curing of the RF component is prioritized over the crosslinking of the rubber latex component in the first treatment step.

On the other hand, in the second RFL impregnation treatment, an RFL treatment liquid is used, which contains a larger amount of a rubber latex component than that of the first RFL treatment liquid and to which at least one vulcanization aid selected from an aqueous dispersion of a sulfur compound, a quinone oxime compound, a methacrylate compound, and a maleimide compound, or a solution obtained by dispersing a vulcanization aid in water is added. The reason why the proportions of the rubber latex component in the RFL treatment liquid are different between the first impregnation treatment and the second impregnation treatment is to increase the adhesion of the RFL layer to both fibers and rubbers having different affinity.

(2) Two kinds of rubber glue treatments (P1 treatment and S1 treatment) are performed in which an adhesion treatment agent made of a rubber glue obtained by dissolving a rubber composition in a solvent is attached to a fiber fabric, and then a baking treatment is performed.

(3) A surface of the fiber fabric is coated with rubber glue and rolled rubber in this order. This step is also referred to as a coating treatment. The expression "in this order" means, in detail, "in this order from the fiber fabric toward the tooth portions 7". In a case where a vulcanization aid is added to the RFL treatment liquid, the same vulcanization aid as that added to the RFL treatment liquid is preferably added to the rubber glue and the rolled rubber used in the coating treatment. Accordingly, a remarkable improvement in the adhesive force between the fiber fabric treated with the RFL treatment liquid and the rubber glue can be expected.

It is not necessary to perform all of the treatments (1) to (3), and any one of the treatments or a combination of two or more of the treatments may be performed as necessary. For example, in a case where a vulcanization aid is added to the RFL treatment liquid in the treatment of (1), the rubber glue treatment of (2) may be omitted because the adhesive force between the fiber fabric and the rubber is considerably increased only by the treatment of (1).

The toothed belt 3 according to the present embodiment is produced by a preliminary molding method. In the preliminary molding method, first, the tooth cloth 11 and the tooth portions 7 are molded in advance by a mold having a tooth pattern to obtain a preliminary molded body, then the obtained preliminary molded body is wound on a mold, and the cords 9 are spirally spun on the preliminary molded body. Then, unvulcanized rubber constituting the back portion 4 is wound thereon, and then, the entire structure is vulcanized in a vulcanization can. In this preliminary molding method, the tooth cloth 11 and the tooth portions 7 are molded in advance before vulcanization, so that it is not necessary to form the tooth portions 7 by flowing the unvulcanized rubber constituting the back portion 4 from between the cords 9 to the inside (the ventral side) and stretching the tooth cloth 11 at the time of vulcanization. Therefore, the distance (pitch) between the cords can be narrowed.

(Tooth Profile and Tooth Pitch BP of Tooth Portion 7)

The tooth profile of the tooth portion 7 may be any of a trapezoidal tooth profile (MXL, XXL, XL, L, H, XH, XXH) defined in JISB 1856 (2018) and ISO 5294 (1989), and an arc tooth profile (H, P, S. R. G) defined in JISB 1857-1 (2015) and ISO 13050 (2014), and the arc tooth profile is preferred from the viewpoint of reducing interference between the toothed belt 3 and the toothed pulleys (the driving pulley 22 and the driven pulley 23) and improving the durability of the toothed belt 3.

A tooth pitch BP of the tooth portions 7 (a distance between tooth portions 7 in the longitudinal direction of the belt (X direction), see FIG. 2) may be selected within a range of 8 mm to 14 mm. Examples of the arc tooth profile corresponding to this include H8M, P8M, S8M, R8M, and G8M (each tooth pitch BP is 8 mm) and H14M, P14M, S14M, and G14M (each tooth pitch BP is 14 mm). The tooth profile may be, for example, H11M (the tooth pitch BP is 11 mm), which is unique to the manufacturer and is not specified in the above standard. When the tooth pitch BP is smaller than 8 mm, the transmission capacity is insufficient, and the durability of the toothed belt 3 may decrease. On the other hand, when the tooth pitch BP is larger than 14 mm, the toothed belt power-transmission apparatus 21 may be increased in size, and the bending fatigue resistance of the toothed belt 3 may decrease. The tooth pitch BP is preferably 11 mm, and the tooth profile is preferably H11M since both durability of the toothed belt 3 and miniaturization of the toothed belt power-transmission apparatus 21 can be achieved.

The tooth pitch BP of the toothed belt 3 is within a range of −0.4% to +0.1% relative to the tooth pitch PP of the driving pulley 22. Further, the tooth pitch BP of the toothed belt 3 is more preferably within a range of −0.2% to +0.1% (particularly, −0.1% to +0.1%) relative to the tooth pitch PP of the driving pulley 22. That is, it is preferable that the tooth pitch BP of the toothed belt 3 and the tooth pitch PP of the driving pulley 22 coincide with each other. The tooth pitch BP of the toothed belt 3 may be smaller than the tooth pitch PP of the driving pulley 22 in consideration of the stretching of the toothed belt 3 after use in the toothed belt power-transmission apparatus 21.

According to the toothed belt 3 configured as described above, the cords 9 embedded in the toothed belt 3 contain carbon fibers, so that tensile strength is improved and durability in high-load transmission is improved.

The bending fatigue resistance of the cords 9 is improved by combining a plurality of primary twisted yarns to form a secondary twist, and setting the twisting direction of the primary twist and the twisting direction of the secondary twist to be the same (Lang's twist).

The cords 9 of the toothed belt 3 have a primary twisting coefficient of 0.62 to 1.30 (preferably 0.75 to 1.15, more preferably 0.90 to 1.00), and a secondary twisting coefficient of 2.06 to 3.95 (preferably 2.45 to 3.55, more preferably 2.80 to 3.20).

Accordingly, the stretching of the cords 9 and the toothed belt 3 can be prevented while ensuring the bending fatigue resistance, and the durability is improved. When the primary twisting coefficient and the secondary twisting coefficient are smaller than the above ranges, the bending fatigue resistance decreases, and conversely, when the primary twisting coefficient and the secondary twisting coefficient are larger than the above ranges, the tensile strength decreases and the stretching of the toothed belt 3 increases, and the durability decreases.

According to the toothed belt power-transmission apparatus 21, the tooth pitch BP of the toothed belt 3 is designed to be within a range of −0.4% to +0.1% relative to the tooth pitch PP of the driving pulley 22. According to this configuration, even when the toothed belt 3 is stretched due to a high load of the toothed belt power-transmission apparatus 21 (driving a rear wheel of the motorcycle), the meshing between the teeth can be favorably maintained in both the driving pulley 22 (small-diameter pulley) and the driven pulley 23 (large-diameter pulley), and the durability of the toothed belt 3 can be improved. When being out of the above range, the meshing between the tooth portions 7 of the toothed belt 3 and the driving pulley teeth 221 of the driving pulley 22 or the driven pulley teeth 231 of the driven pulley 23 may deteriorate, and the durability of the toothed belt 3 may decrease.

The tooth pitch BP of the toothed belt 3 is set within a range of −0.2% to +0.1% (in particular, −0.1% to +0.1%) relative to the tooth pitch PP of the driving pulley 22, and the tooth pitch BP of the toothed belt 3 and the tooth pitch PP of the driving pulley 22 are made to coincide with each other as much as possible, so that the tooth pitch BP of the toothed belt 3 is set within a range that is larger than that of a product according to the related art (a toothed belt whose tooth pitch BP is made smaller than the tooth pitch PP of the toothed pulley and which is intended to cope with the stretching of the toothed belt due to use). Accordingly, deterioration of meshing due to sand biting can be prevented, and the durability of the toothed belt 3 can be further improved.

Further, according to the above configuration, even when the outer diameter OD of the driving pulley 22 of the toothed belt power-transmission apparatus 21 is relatively small, i.e., 67 mm to 90 mm, the durability of the toothed belt 3 can be improved while maintaining the transmission capacity, so that the toothed belt power-transmission apparatus 21 can be downsized.

EXAMPLES (Toothed Belt)

In Examples 1 to 6 and Comparative Examples 1 to 7, toothed belts having a belt size of 120H11M25 (number of tooth portions: 120, tooth profile: H11M, tooth pitch BP: about 11 mm, belt width: 25 mm) were produced using the following members.

In Examples 7 to 10 and Comparative Examples 8 and 9, toothed belts having a belt size of 144H14M21 (number of tooth portions: 144, tooth profile: H14M, tooth pitch BP: about 14 mm, belt width: 21 mm) were produced using the following members.

(Rubber Composition: Back Portion Tooth Portion)

TABLE 1

|  | Tooth portion | Back portion | Coat treatment |
|---|---|---|---|
| HNBR | — | 80 | 50 |
| HNBR containing unsaturated carboxylic acid metal salt | 100 | 20 | 50 |
| Aramid short fiber | 1 | — | — |
| Stearic acid | 1 | 1 | 1 |
| Carbon black SRF | 2 | 2 | — |
| Silica | — | 40 | 50 |
| Calcium carbonate | 10 | — | — |
| Zinc oxide | 5 | 2 | 2 |
| Plasticizer | — | 10 | 10 |
| Antioxidant | 2 | 2 | 2 |
| Organic peroxide | 2 | 2 | 2 |
| Total | 123 | 159 | 167 |

Unit: parts by mass
(Materials for Use of Rubber Composition)
HNBR: "Zetpol 2010" manufactured by Zeon Corporation, iodine value 11 mg/100 mg
HNBR containing an unsaturated carboxylic acid metal salt: "Zeoforte ZSC2295CX" manufactured by Zeon Corporation, HNBR: unsaturated carboxylic acid metal salt (mass ratio) = 100:110, iodine value of base HNBR: 28 mg/100 mg
Aramid short fiber: "Cornex" manufactured by Teijin Limited, average fiber length: 3 mm, average fiber diameter: 14 μm
Stearic acid: "STEARIC ACID CAMELLIA" manufactured by NOF Corporation
Carbon black SRF: "SEAST S" manufactured by Tokai Carbon Co., Ltd., average particle diameter: 66 nm, iodine adsorption amount: 2.6 mg/g
Silica: "ULTRASIL VN-3" manufactured by Evonik Degussa Japan Co., Ltd., specific surface area: 155 to 195 m$^2$/g
Calcium carbonate: "Super #1500" manufactured by Maruo Calcium Co., Ltd., average particle diameter: 1.5 μm
Zinc oxide: "zinc oxide second grade" manufactured by Sakai Chemical Industry Co., Ltd., average particle diameter: 0.55 μm
Plasticizer: "Adeka Cizer RS700" manufactured by ADEKA Corporation
Antioxidant: p,p'-dioctyldiphenylamine ("NONFLEX OD3" manufactured by Seiko Chemical Co., Ltd.)
Organic peroxide: 1,3-bis (t-butylperoxyisopropyl) benzene, theoretical content of active oxygen: 9.45%

(Multifilament Yarn of Carbon Fibers Constituting Cord)

"TORAYCAT700SC-12000" manufactured by Toray Industries. Inc., tensile elastic modulus: 230 GPa, filament fineness: 0.67 dtex, number of filaments: 12000, fineness: 800 tex (Treatment of Cord)

The cord was impregnated with a treatment liquid obtained by dissolving the rubber latex and the epoxy resin in toluene.

(Tooth Cloth and Treatment of Tooth Fabric)

The configuration of the tooth cloth was the same as that of Patent Literature 1. In addition, the RFL treatment (B-1 and B-2) and the coating treatment were performed in the same manner as in Patent Literature 1. The P1 treatment and the S1 treatment are not performed.

(Production of Toothed Belt)

In the production of each of toothed belts of Examples 1 to 6 and Comparative Examples 1 to 7 according to the preliminary molding method, first, a tooth cloth and an unvulcanized rubber sheet (thickness: 2.55 mm) to form a tooth portion are placed on a mold having a tooth profile, and pressed under conditions of 120° C. 160 seconds, and a pressing pressure of 4.51 MPa (surface pressure) to prepare a preliminary molded body. Next, the prepared preliminary molded body is wound on a mold, and the cords 9 are spirally spun on the preliminary molded body under the conditions of a spinning tension of 460 to 700 N/cord, a spinning pitch of 2.2 mm/cord, and a spinning speed of 1.5 m/s. An unvulcanized rubber sheet (thickness: 1.35 mm) constituting the back portion was wound thereon, and then the entire structure was vulcanized using a vulcanization can under the conditions of a vulcanization temperature of 179° C., a vulcanization time of 40 minutes, and a vapor pressure of 0.83 MPa to prepare a toothed belt.

In the production of each of toothed belts of Examples 7 to 10 and Comparative Examples 8 and 9 according to the preliminary molding method, first, a tooth cloth and an unvulcanized rubber sheet (thickness: 2.90 mm) to form a tooth portion are placed on a mold having a tooth profile, and pressed under conditions of 120° C., 160 seconds, and a pressing pressure of 4.51 MPa (surface pressure) to prepare a preliminary molded body. Next, the prepared preliminary molded body is wound on a mold, and the cords 9 are spirally spun on the preliminary molded body under the conditions of a spinning tension of 300 to 960 N/cord, a spinning pitch of 2.2 mm/cord, and a spinning speed of 1.5 m/s. An unvulcanized rubber sheet (thickness: 2.10 mm) constituting the back portion was wound thereon, and then the entire structure was vulcanized using a vulcanization can under the conditions of a vulcanization temperature of 179° C., a vulcanization time of 40 minutes, and a vapor pressure of 0.83 MPa to prepare a toothed belt.

(Measurement of PLD of Tooth Belt)

Figure 4:
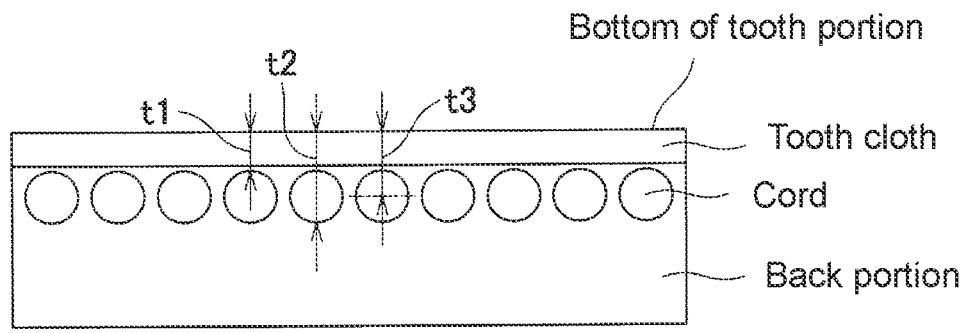
FIG. 4 is an illustration view relating to measurement of a PLD of the toothed belt.

PLD (distance from the bottom portion of the tooth portion to the center of the cord) of the toothed belt was measured as follows. First, the toothed belt is cut in parallel in the width direction, and a cross section thereof is observed with a microscope at a magnification of 20 times. As shown in FIG. 4, a distance (t1) from a bottom portion of a tooth portion to a portion directly above the cord and a distance (t2) from the bottom portion of the tooth portion to a portion directly below the cord were measured and were averaged ((t1+t2)/2) to determine a distance (t3) from the bottom portion of the tooth portion to the center of the cord. This distance (t3) was determined for all the cords cut in the cross section, and an arithmetic average value of these distances (t3) was calculated and used as the PLD of the toothed belt. In this case, the cord to be measured was limited to a cord in which the entire cross section could be observed, and a cord in which the entire cross section could not be observed (a part thereof was overlapped with the belt end surface) was excluded from the measurement target.

(Measurement of Tooth Pitch BP of Toothed Belt)

The tooth pitch BP of the toothed belt of each of Examples 1 to 6 and Comparative Examples 1 to 7 was determined by dividing the total length (pitch circumferential length) of the toothed belt measured with a belt length measuring machine by the number of tooth portions of the toothed belt. The number of teeth of each of the two inspection pulleys was 30, and the inspection load was 966 N. The length of the toothed belt was measured after the driving pulley was rotated at 30 rpm and the toothed belt was fitted to the inspection pulley after 10 seconds passed from the start of rotation.

The tooth pitch BP of the toothed belt of each of Examples 7 to 10 and Comparative Examples 8 and 9 was obtained by dividing the entire length (pitch circumferential length) of the toothed belt measured with a belt length measuring machine by the number of tooth portions of the toothed belt. The number of teeth of each of the two inspection pulleys was 30, and the inspection load was 1186 N. The length of the toothed belt was measured after the driving pulley was rotated at 30 rpm and the toothed belt was fitted to the inspection pulley after 10 seconds passed from the start of rotation.

(Durability Travelling Test)

Next, the toothed belts according to Examples 1 to 10 and Comparative Examples 1 to 9 were subjected to a running test under high load conditions using a biaxial high load running tester having the same layout as that of the toothed belt power-transmission apparatus 21 shown in FIG. 6 to verify the technical effects of the toothed belts according to Examples 1 to 10 (test results: see Tables 2 and 3).

(Test Conditions: Examples 1 to 6 and Comparative Examples 1 to 7 (Examples 7 to 10 and Comparative Examples 8 and 9))

Test machine: biaxial high load running tester (see FIG. 6)
  Pulley tooth profile (driving pulley, driven pulley): H11M (H14M)
  PLD of pulley (driving pulley, driven pulley): 1.10 mm (1.10 mm)
  Tooth pitch of pulley (driving pulley, driven pulley): 11.000 mm (14.000 mm)
  Number of teeth of driving pulley: 26 (30)
  Number of teeth of driven pulley: 59 (70)
  Initial tension of belt: 1050 N (1150 N)

Control Pattern of Rotational Speed of Driving Pulley:
  (1) increasing from 0 rpm to 3150 rpm in 25 seconds;
  (2) retaining at 3150 rpm for 230 seconds;
  (3) decreasing from 3150 rpm to 0 rpm in 15 seconds;
  (4) increasing from 0 rpm to 3150 rpm in 20 seconds;
  (5) decreasing from 3150 rpm to 0 rpm in 20 seconds: and
  (6) repeating patterns of (4) to (5) five times.
  The above is repeated as one cycle.

Control Pattern of Load Torque:
  (1) increasing from 0 N m to 690 N-m in 2 seconds;
  (2) decreasing from 690 N-m to 220 N-m in 5 seconds;
  (3) retaining at 220 N m for 230 seconds;
  (4) decreasing from 220 N m to 0 N-m in 15 seconds;
  (5) increasing from 0 N-m to 690 N-m in 2 seconds;
  (6) decreasing from 690 N-m to 0 N-m in 35 seconds; and
  (7) repeating patterns of (5) to (6) five times.
  The above is repeated as one cycle.

Sand-applying condition: type of sand: blend of silica sand and cement sand
  Sand-applying place: meshing entrance of driven pulley
  Sand-applying amount and frequency: 5 g/cycle was performed such that 5 cycles are continuously performed, and no sand applying was performed for the subsequent 35 cycles. This is repeated thereafter.

Example 1

A multifilament yarn of carbon fibers that has a fineness of 800 tex was subjected to primary twist in the S direction at 32 times/m to prepare four primary twisted yarns. The four prepared primary twisted yarns were aligned and were subjected to secondary twist in the S direction at 51 times/m to prepare a Lang's twisted cord having a total fineness of 3200 tex. In addition, the twisted cord was subjected to an adhesion treatment by the above-described method to produce a treated cord. Using this treated cord as a cord, a toothed belt was produced according to the method described in the method for producing a toothed belt with a spinning tension of 630 N/cord. The tooth pitch of the toothed belt was 10.964 mm, and the PLD of the toothed belt was 1.10 mm.

Example 2

A toothed belt was produced in the same manner as in Example 1 except that the spinning tension was set to 500 N/cord. A tooth pitch of the toothed belt was 11.000 mm, and a PLD of the toothed belt was 1.10 mm.

Example 3

A toothed belt was produced in the same manner as in Example 2, except that a multifilament yarn of carbon fibers that has a fineness of 800 tex was subjected to primary twist in the S direction at 44 times/m to produce four primary twisted yarns, and the produced four primary twisted yarns were aligned and subjected to secondary twist in the S direction at 67 times/m to produce a Lang's twisted cord having a total fineness of 3200 tex.

Example 4

A toothed belt was produced in the same manner as in Example 2, except that a multifilament yarn of carbon fibers that has a fineness of 800 tex was subjected to primary twist in the S direction at 21 times/m to produce four primary twisted yarns, and the produced four primary twisted yarns were aligned and subjected to secondary twist in the S direction at 35 times/m to produce a Lang's twisted cord having a total fineness of 3200 tex.

Example 5

A toothed belt was produced in the same manner as in Example 1 except that the spinning tension was set to 580 N/cord. A tooth pitch of the toothed belt was 10.978 mm.

Example 6

A toothed belt was produced in the same manner as in Example 1 except that the spinning tension was set to 460 N/cord. A tooth pitch of the toothed belt was 11.011 mm.

Comparative Example 1

A multifilament yarn of carbon fibers that has a fineness of 800 tex was subjected to primary twist in the S direction at 32 times/m to prepare three primary twisted yarns. A toothed belt was produced in the same manner as in Example 1 except that the produced three primary twisted yarns were aligned and subjected to secondary twist in the S direction at 39 times/m to produce a Lang's twisted cord having a total fineness of 2400 tex. A tooth pitch of the toothed belt was 10.964 mm, and a PLD of the toothed belt was 1.00 mm.

Comparative Example 2

A multifilament yarn of carbon fibers that has a fineness of 800 tex was subjected to primary twist in the S direction at 32 times/m to prepare four primary twisted yarns. A toothed belt was produced in the same manner as in Example 1, except that the produced four primary twisted yarns were aligned and subjected to secondary twists in the S direction at 34 times/m to produce a Lang's twisted cord having a total fineness of 3200 tex. The tooth pitch of the toothed belt was 10.964 mm, and the PLD of the toothed belt was 1.10 mm.

Comparative Example 3

A toothed belt was produced in the same manner as in Example 1, except that four multifilament yarns of carbon fibers having a fineness of 800 tex were aligned and twisted in the S direction at 16.2 times/m to produce a single-twisted cord having a total fineness of 3200 tex. A tooth pitch of the toothed belt was 10.964 mm, and a PLD of the toothed belt was 1.08 mm.

Comparative Example 4

A multifilament yarn of carbon fibers that has a fineness of 800 tex was subjected to primary twist in the S direction at 32 times/m to prepare four primary twisted yarns. A toothed belt was produced in the same manner as in Example 1, except that the produced four primary twisted yarns were aligned and subjected to secondary twist in the Z direction at 51 times/m to produce a plied twisted cord having a total fineness of 3200 tex. A tooth pitch of the toothed belt was 10.964 mm, and a PLD of the toothed belt was 1.11 mm.

Comparative Example 5

A multifilament yarn of carbon fibers that has a fineness of 800 tex was subjected to primary twist in the S direction at 32 times/m to prepare four primary twisted yarns. A toothed belt was produced in the same manner as in Example 1, except that the produced four primary twisted yarns were aligned and subjected to secondary twist in the S direction at 107 times/m to produce a Lang's twisted cord having a total fineness of 3200 tex. A tooth pitch of the toothed belt was 10.964 mm, and a PLD of the toothed belt was 1.11 mm.

Comparative Example 6

A toothed belt was produced in the same manner as in Example 1 except that the spinning tension was 700 N/cord. A tooth pitch of the toothed belt was 10.945 mm.

Comparative Example 7

A toothed belt was produced in the same manner as in Example 1 except that the spinning tension was 420 N/cord. A tooth pitch of the toothed belt was 11.022 mm.

TABLE 2

|  | Examples | | | | | | Comparative Examples |
|---|---|---|---|---|---|---|---|
|  | 1 | 2 | 3 | 4 | 5 | 6 | 1 |
| Twist configuration | 12K-1/4 | 12K-1/4 | 12K-1/4 | 12K-1/4 | 12K-1/4 | 12K-1/4 | 12K-1/3 |
| Twisting method | Lang's twist | Lang's twist | Lang's twist | Lang's twist | Lang's twist | Lang's twist | Lang's twist |
| Fineness of primary twisted yarn (tex) | 800 | 800 | 800 | 800 | 800 | 800 | 800 |
| Primary twist times (times/m) | 32 | 32 | 44 | 21 | 32 | 32 | 32 |
| Primary twisting coefficient | 0.94 | 0.94 | 1.30 | 0.62 | 0.94 | 0.94 | 0.94 |

TABLE 2-continued

| | | | | | | | |
|---|---|---|---|---|---|---|---|
| Total fineness (tex) | 3200 | 3200 | 3200 | 3200 | 3200 | 3200 | 2400 |
| Secondary twist times (times/m) | 51 | 51 | 67 | 35 | 51 | 51 | 39 |
| Secondary twisting coefficient | 3.01 | 3.01 | 3.95 | 2.06 | 3.01 | 3.01 | 1.99 |
| Cord diameter (mm) | 2.10 | 2.10 | 2.10 | 2.10 | 2.10 | 2.10 | 1.88 |
| Tooth pitch of toothed belt (mm) | 10.964 | 11.000 | 11.000 | 11.000 | 10.978 | 11.011 | 10.964 |
| PLD of toothed belt (mm) | 1.10 | 1.10 | 1.10 | 1.10 | 1.10 | 1.10 | 1.00 |
| Tooth portion hardness (JIS-D) | 63 | 63 | 63 | 63 | 63 | 63 | 63 |
| Back portion hardness (JIS-A) | 83 | 83 | 83 | 83 | 83 | 83 | 83 |
| Lifetime (h) | 80 | 100 | 80 | 80 | 90 | 95 | 55 |
| Failure form | Tooth chipping | Tooth chipping | Tooth chipping | Tooth chipping | Tooth chipping | Tooth chipping | Cutting |
| Tooth pitch of toothed belt relative to tooth pitch of toothed pulley | −0.33% | ±0 | ±0 | ±0 | −0.2% | +0.1% | −0.33% |

| | Comparative Examples | | | | | |
|---|---|---|---|---|---|---|
| | 2 | 3 | 4 | 5 | 6 | 7 |
| Twist configuration | 12K-1/4 | 12K-4/0 | 12K-1/4 | 12K-1/4 | 12K-1/4 | 12K-1/4 |
| Twisting method | Lang's twist | Single twist | Plied twist | Lang's twist | Lang's twist | Lang's twist |
| Fineness of primary twisted yarn (tex) | 800 | 3200 | 800 | 800 | 800 | 800 |
| Primary twist times (times/m) | 32 | 51 | 32 | 32 | 32 | 32 |
| Primary twisting coefficient | 0.94 | 0.95 | 0.94 | 0.94 | 0.94 | 0.94 |
| Total fineness (tex) | 3200 | 3200 | 3200 | 3200 | 3200 | 3200 |
| Secondary twist times (times/m) | 34 | — | 51 | 107 | 51 | 51 |
| Secondary twisting coefficient | 2.00 | — | 3.01 | 6.31 | 3.01 | 3.01 |
| Cord diameter (mm) | 2.10 | 2.05 | 2.12 | 2.12 | 2.10 | 2.10 |
| Tooth pitch of toothed belt (mm) | 10.964 | 10.964 | 10.964 | 10.964 | 10.945 | 11.022 |
| PLD of toothed belt (mm) | 1.10 | 1.08 | 1.11 | 1.11 | 1.10 | 1.10 |
| Tooth portion hardness (JIS-D) | 63 | 63 | 63 | 63 | 63 | 63 |
| Back portion hardness (JIS-A) | 83 | 83 | 83 | 83 | 83 | 83 |
| Lifetime (h) | 70 | 5 | 20 | 40 | 40 | 40 |
| Failure form | Cutting | Cutting | Cutting | Cutting | Cutting | Cutting |
| Tooth pitch of toothed belt relative to tooth pitch of toothed pulley | −0.33% | −0.33% | −0.33% | −0.33% | −0.5% | +0.2% |

Examples 7 to 10 and Comparative Examples 8 and 9

Examples 7 to 10 and Comparative Examples 8 and 9 are toothed belts having a tooth profile of H14M as described above, and the secondary twisting coefficient (3.01) and the primary twisting coefficient (0.94) were fixed and only the spinning tension (a tooth pitch of the toothed belt) was changed.

Example 7

The cord was the same as in Example 1, the spinning tension was 800 N/cord, and the tooth pitch of the toothed belt was 13.944 mm.

Example 8

The spinning tension was 940 N/cord, and the tooth pitch of the toothed belt was 13.972 mm.

Example 9

The spinning tension was 550 N/cord, and the tooth pitch of the toothed belt was 14.000 mm.

Example 10

The spinning tension was 350 N/cord, and the tooth pitch of the toothed belt was 14.014 mm.

Comparative Example 8

The spinning tension was 960 N/cord, and the tooth pitch of the toothed belt was 13.930 mm.

Comparative Example 9

The spinning tension was set to 300 N/cord, and the tooth pitch of the toothed belt was set to 14.028 mm.

(Test Results)

TABLE 3

|  | Examples | | | | Comparative Examples | |
| --- | --- | --- | --- | --- | --- | --- |
|  | 7 | 8 | 9 | 10 | 8 | 9 |
| Twist configuration | 12K-1/4 | 12K-1/4 | 12K-1/4 | 12K-1/4 | 12K-1/4 | 12K-1/4 |
| Twisting method | Lang's twist | Lang's twist | Lang's twist | Lang's twist | Lang's twist | Lang's twist |
| Fineness of primary twisted yarn (tex) | 800 | 800 | 800 | 800 | 800 | 800 |
| Primary twist times (times/m) | 32 | 32 | 32 | 32 | 32 | 32 |
| Primary twisting coefficient | 0.94 | 0.94 | 0.94 | 0.94 | 0.94 | 0.94 |
| Total fineness (tex) | 3200 | 3200 | 3200 | 3200 | 3200 | 3200 |
| Secondary twist times (times/m) | 51 | 51 | 51 | 51 | 51 | 51 |
| Secondary twisting coefficient | 3.01 | 3.01 | 3.01 | 3.01 | 3.01 | 3.01 |
| Cord diameter (mm) | 2.10 | 2.10 | 2.10 | 2.10 | 2.10 | 2.10 |
| Tooth pitch of toothed belt (mm) | 13.944 | 13.972 | 14.000 | 14.014 | 13.930 | 14.028 |
| PLD of toothed belt (mm) | 1.10 | 1.10 | 1.10 | 1.10 | 1.10 | 1.10 |
| Tooth portion hardness (JIS-D) | 63 | 63 | 63 | 63 | 63 | 63 |
| Back portion hardness (JIS-A) | 83 | 83 | 83 | 83 | 83 | 83 |
| Lifetime (h) | 80 | 90 | 100 | 95 | 40 | 60 |
| Failure form | Tooth chipping | Tooth chipping | Tooth chipping | Tooth chipping | Cutting | Cutting |
| Tooth pitch of toothed belt relative to tooth pitch of toothed pulley | −0.4% | −0.2% | ±0% | +0.1% | −0.5% | +0.2% |

Discussion

In Examples 1 to 6, the lifetime was 80 hours or longer, and it can be said that a treatment for abnormality such as replacement of a toothed belt can be easily performed because the failure form is tooth chipping. On the other hand, in Comparative Examples 1 to 7, the lifetime was 70 hours or shorter, which was an unpredictable failure form of cutting.

In Comparative Example 1, it is considered that the tensile strength is insufficient because a small-diameter cord is used in which the number of aligned primary twisted yarns is 3. In Comparative Example 2, it is considered that the bending fatigue resistance is insufficient because the secondary twisting coefficient is too small. In Comparative Example 3 and Comparative Example 4, it is considered that the bending fatigue resistance is insufficient because the twisting method of the cord is single twist or plied twist. In Comparative Example 5, it is considered that the tensile strength is insufficient or the stretching of the toothed belt is increased and the meshing deteriorates because the secondary twisting coefficient is too large. In Comparative Examples 6 and 7, only the tooth pitch of the toothed belt was changed from that of Example 1, but the lifetime was reduced because the tooth pitch of the toothed belt was out of the range of −0.4% to +0.1% relative to the tooth pitch of the toothed pulley.

On the other hand, in Example 1, it is considered that both the tensile strength and the bending fatigue resistance can be increased, and the meshing is maintained relatively favorably. In Example 2, it is considered that, by making the tooth pitch of the toothed belt coincide with the tooth pitch of the pulley, deterioration of meshing due to sand biting can be prevented, and thus the lifetime is further improved. In Examples 5 and 6, only the tooth pitch of the toothed belt was changed from that of Example 1, but good results were obtained when the tooth pitch of the toothed belt was within the range of −0.2% to +0.1% relative to the tooth pitch of the toothed pulley.

In Examples 7 to 10, the lifetime of Example 9 in which the tooth pitch of the toothed belt was ±0% of the tooth pitch of the toothed pulley was the longest, and the lifetime decreased as the difference therebetween increased. On the other hand, in Comparative Examples 8 and 9, when the tooth pitch of the toothed belt was out of the range of −0.4% to +0.1% relative to the tooth pitch of the toothed pulley, the lifetime was significantly reduced. In addition, cutting that is an unpredictable failure form also occurred.

Although the present invention has been described in detail with reference to a specific embodiment, it is obvious to those skilled in the art that various changes and modifications may be made without departing from the gist and the scope of the present invention.

The present application is based on Japanese Patent Application No. 2020-094540 filed on May 29.2020 and Japanese Patent Application No. 2021-083225 filed on May 17, 2021, contents of which are incorporated herein as reference.

REFERENCE SIGNS LIST

3 Toothed belt
4 Back portion
5 Short fiber
6 Warp
7 Tooth portion
8 Weft
9 Cord
11 Tooth cloth 21 Toothed belt power-transmission apparatus
22 Driving pulley
23 Driven pulley

The invention claimed is:

1. A toothed belt power-transmission apparatus comprising:
   a toothed belt which comprises a cord extending in a belt longitudinal direction and embedded in the belt, and a plurality of belt tooth portions arranged at a predetermined interval in the belt longitudinal direction; and
   a plurality of toothed pulleys which comprises, on an outer circumference thereof, a plurality of pulley tooth portions facing the belt tooth portions and around which the toothed belt is wound,
   wherein the cord comprises a carbon fiber cord formed by combining and secondarily twisting a plurality of primary twisted yarns comprising a carbon fiber,
   a twisting direction of a primary twist of the primary twisted yarns is the same as a twisting direction of the secondary twist,
   a primary twisting coefficient of the primary twist is 0.62 to 1.30,
   a secondary twisting coefficient of the secondary twist is 2.06 to 3.95, and
   a tooth pitch of the toothed belt is within a range of −0.4% to +0.1% relative to a tooth pitch of the toothed pulley around which the toothed belt is wound.

2. The toothed belt power-transmission apparatus according to claim 1, wherein the tooth pitch of the toothed belt is within a range of −0.2% to +0.1% relative to the tooth pitch of the toothed pulley.

3. The toothed belt power-transmission apparatus according to claim 1, which is used for driving a rear wheel of a motorcycle.

4. The toothed belt power-transmission apparatus according to claim 2, which is used for driving a rear wheel of a motorcycle.

* * * * *